United States Patent
Yamazaki

(10) Patent No.: US 7,675,548 B2
(45) Date of Patent: Mar. 9, 2010

(54) SHAKE CORRECTING DEVICE, SHAKE CORRECTING METHOD AND CONTROL PROGRAM FOR IMPLEMENTING THE METHOD

(75) Inventor: Tatsuya Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 10/910,761

(22) Filed: Aug. 4, 2004

(65) Prior Publication Data
US 2005/0031326 A1 Feb. 10, 2005

(30) Foreign Application Priority Data
Aug. 7, 2003 (JP) ............... 2003-206574

(51) Int. Cl.
*H04N 5/228* (2006.01)
*G03B 17/00* (2006.01)

(52) U.S. Cl. .................. 348/208.7; 348/208.2; 396/55

(58) Field of Classification Search ............ 348/208.99, 348/208.2, 208.4, 208.5, 208.7, 208.8, 208.11, 348/208.12, 208.16; 396/52, 53, 54, 55
See application file for complete search history.

(56) References Cited

U.S. PATENT DOCUMENTS

| | | | | |
|---|---|---|---|---|
| 5,748,993 A | * | 5/1998 | Shiomi | 396/52 |
| 5,831,671 A | * | 11/1998 | Chigira et al. | 348/208.8 |
| 6,181,875 B1 | * | 1/2001 | Hamada et al. | 396/55 |
| 6,263,162 B1 | | 7/2001 | Yamazaki et al. | 396/55 |
| 6,278,842 B1 | * | 8/2001 | Yamazaki et al. | 396/55 |
| 6,374,049 B1 | * | 4/2002 | Fujinaga | 396/55 |
| 6,801,247 B1 | * | 10/2004 | Ohishi et al. | 348/208.1 |
| 7,443,422 B2 | | 10/2008 | Usui | 348/208.11 |
| 2004/0136704 A1 | * | 7/2004 | Usui | 396/55 |

FOREIGN PATENT DOCUMENTS

| | | |
|---|---|---|
| JP | 8-136962 | 5/1996 |
| JP | 11-308521 | 11/1999 |
| JP | 2000-66260 | 3/2000 |
| JP | 2003-172961 | 6/2003 |

* cited by examiner

*Primary Examiner*—Sinh Tran
*Assistant Examiner*—Albert H Cutler
(74) *Attorney, Agent, or Firm*—Fitzpatrick, Cella, Harper & Scinto

(57) ABSTRACT

A shake correcting device is capable of preventing a correcting optical device from hitting against a component part in the vicinity thereof to generate noise upon outputs from an H bridge driver for driving the correcting optical device being enabled. The device includes an angular velocity sensor that detects shaking of an image pickup apparatus, a position sensor that detects the current position of a shift lens movably disposed for optically correcting the shaking of the apparatus, an H bridge driver that drives the lens according to a drive target value, and an integrator that generates a target correction value based on the output from the angular velocity sensor. The drive target value is calculated based on the target correction value and output data from the position sensor.

8 Claims, 11 Drawing Sheets

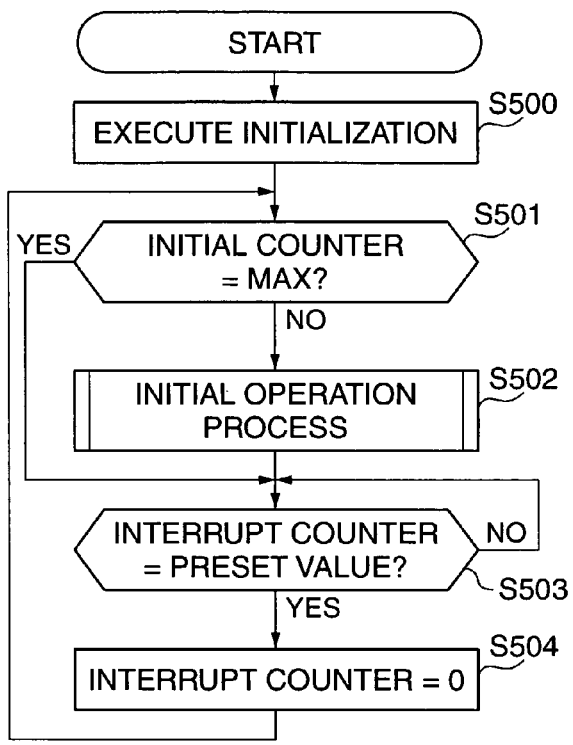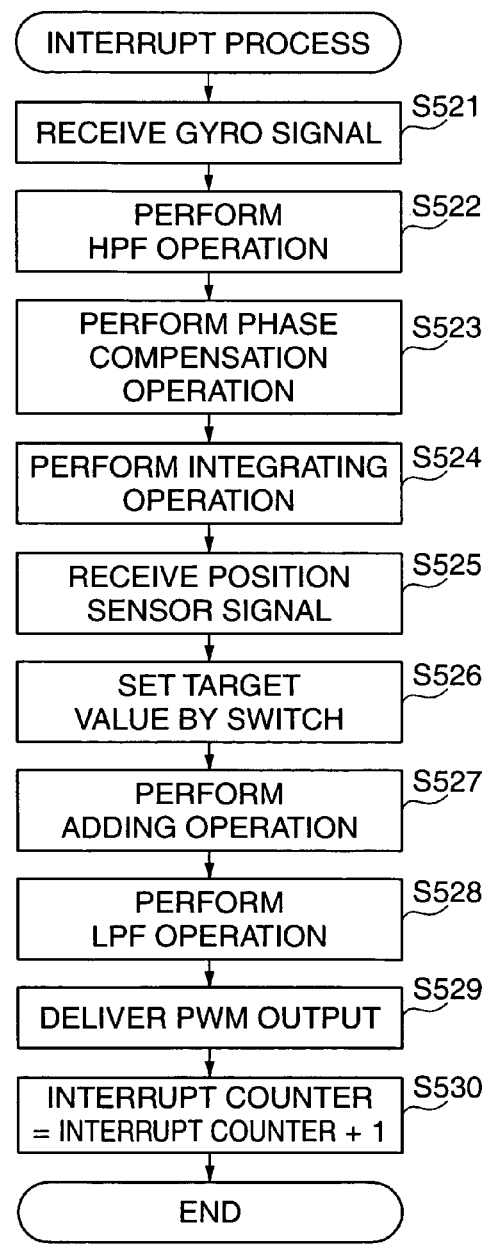

SHAKE CORRECTING DEVICE, SHAKE CORRECTING METHOD AND CONTROL PROGRAM FOR IMPLEMENTING THE METHOD

CROSS REFERENCE TO RELATED APPLICATION

This application claims priority from Japanese Patent Application No. 2003-206574 filed Aug. 7, 2003, which is hereby incorporated by reference herein.

BACKGROUND OF THE INVENTION

1. Field of the Invention

The present invention relates to a shake correcting device incorporated in cameras or video cameras, a shake correcting method for apparatuses, such as cameras or video cameras, and a control program for implementing the shake correcting method.

2. Description of the Related Art

Conventionally, an optical shake correcting device has been proposed as a shake correcting device incorporated in image pickup apparatuses, such as cameras or video cameras. The optical shake correcting device performs shake correction by moving at least one of taking lenses in a direction perpendicular to the optical axis thereof and thereby changing the optical axis. FIG. 9 shows an example of the arrangement of the optical shake correcting device (disclosed in Japanese Laid-Open Patent Publication (Kokai) No. 2000-66260).

In FIG. 9, reference numeral 101 designates an angular velocity sensor that is comprised of a vibration gyro, and detects a shake of an image pickup apparatus, 102 a bypass filter that eliminates a drift and other undesired components of the output from the angular velocity sensor 101, 103 an amplifier that amplifies an angular velocity signal indicative of the detected angular velocity, and 120 a microcomputer that controls the overall operation of the image pickup apparatus, including autofocus (AF) control, zoom control, automatic exposure (AE) control, mechanical part control, and power supply control.

Reference numeral 104 designates an A/D converter incorporated in the microcomputer 120. The angular velocity signal is converted to a digital signal by the A/D converter 104 to provide angular velocity data. The angular velocity data is subjected to predetermined signal processing through a high-pass filter (HPF) 105 and a phase compensation filter 106, and an integrator 108 at the next stage generates a shake correction signal. The output from the integrator 108 is used as a target drive value for a shift lens 119, and converted into a PWM signal by a pulse width modulator (PWM) 117, followed by being outputted as a PWM output from the microcomputer 120.

Reference numeral 901 designates a low-pass filter (LPF) that converts the PWM output into a direct current corresponding to a correction amount, i.e. the target drive value. Reference numeral 114 designates a position sensor that detects the current position of the shift lens 119, and 905 an amplifier that amplifies the output from the position sensor 114. An adder 902 calculates the difference between the target drive value, i.e. the output from the LPF 901 and a value corresponding to the current position of the shift lens 119, i.e. the amplified output from the position sensor 114. The output from the adder 902 is supplied to a driver 904 that is implemented by an operational amplifier, and the driver 904 passes an electric current through a coil (not shown) that drives the shift lens 119, to thereby move the shift lens 119 such that a desired optical axis correction angle can be obtained. Shake correction is achieved through these operations.

Further, in FIG. 9, symbol Vp designates a power supply for driving the shift lens 119. The electric power of the power supply Vp is supplied to the driver 904. On the other hand, symbol Vc designates a control power supply, and the electric power of the control power supply Vc is used for driving component parts other than the driver 904. Reference numerals 804 and 805 designate switches operated for supplying power from the respective power supplies Vp and Vc to their associated component parts. For example, in a reproduction mode in which the video camera as the image pickup apparatus does not need an anti-shake function, the switches 804 and 805 are kept off by a power supply controller 803 that operates according to commands from the microcomputer 120, whereby the drive current is interrupted for saving energy.

Now, there are problems in turning on and off the power of the shake correcting device. More specifically, if the drive current suddenly starts flowing upon turning-on of the power, a lens retainer frame that retains the shift lens 119 hits against an inner end of a lens barrel, thereby causing large impact noise. On the other hand, when the power is turned off, the retaining force is cancelled and the shift lens 119 drops due to its own weight so that the lens retainer frame hits against an opposite inner end of the lens barrel, thereby also generating impact noise. The impact noise thus generated degrades the quality of the image pickup apparatus.

To overcome the problem that occurs when the power is turned on, the proposed shake correcting device is configured such that a DC potential to be obtained by smoothing the PWM output from the microcomputer 120 becomes equal to the reference voltage of each of the sections or component parts of the device, and the switches 804 and 805 are controlled to be turned on in the same timing, to thereby suppress generation of impact noise due to hitting of the lens retainer frame against the inner end of the lens barrel. On the other hand, to overcome the problem that occurs when the power is turned off, just before the switches 804 and 805 are turned off, the shift lens 119 is caused to slowly move to a point close to the inner end of the lens barrel, and then the switches 804 and 805 are turned off to thereby suppress generation of impact noise to the minimum, as disclosed in Japanese Laid-Open Patent Publication (Kokai) No. 2000-66260.

In the conventional correcting device constructed as above, however, since the shift lens 119 is driven by a drive coil which is driven by the operational amplifier, the circuit has a large internal loss, leading to increased power consumption.

To overcome this inconvenience of increased power consumption, a control method has been proposed e.g. in Japanese Laid-Open Patent Publications (Kokai) No. H08-136962 and No. H11-308521, in which an H bridge circuit is used to drive the drive coil directly by the PWM output.

FIG. 10 is a block diagram showing the arrangement of a conventional optical shake correcting device based on the PWM drive control method using a H bridge circuit. In FIG. 10, component parts and elements corresponding to those shown in FIG. 9 are designated by identical reference numerals, and detailed description thereof is omitted.

In FIG. 10, reference numeral 116 designates an A/D converter incorporated in the microcomputer 120. The A/D converter 116 converts the amplified output from the position sensor 114 into a digital signal. Reference numeral 111 designates an adder that calculates the difference between a value corresponding to the current position of the shift lens 119 and the target drive value for the shift lens 119. The output from the adder 111 provides an actual correction amount. Reference numeral 112 designates a low-pass filter (LPF) for reducing drive noise generated by an H bridge driver 113. The output from the LFP 112 is subjected to pulse width modulation (PWM) by the PWM section 117, followed by being delivered as the PWM output from the microcomputer 120. The shift lens 119 is driven by this PWM output via the H bridge driver 113.

The use of the PWM drive control method makes it possible to avoid internal loss, thereby improving energy conversion efficiency and hence reducing power consumption in contrast with the shake correcting device shown in FIG. 9.

Further, the use of the PWM drive control method makes it possible to turn off the drive current without using the power switches 804 and 805 appearing in FIG. 9, so that the peripheral arrangement associated with the power supply can be simplified. This point will be further described with reference to FIGS. 11A and 11B. FIG. 11A shows the arrangement of the input and output terminals of the H bridge driver 113 and elements associated therewith, and FIG. 11B shows the logic of the input and output terminals.

When the PWM drive control method is employed, outputs 1 and 2 from the H bridge driver 113 exhibit output values shown in FIG. 11B, according to the PWM waveform inputted to an input terminal 113*a*, and depending on the outputs 1 and 2, an electric current flows through a drive coil 113*c* to drive the shift lens 119.

An enable terminal 113*b* appearing in FIG. 11A, when its logic level is set to an L level, as shown in FIG. 11B, in the reproduction mode which does not need shake correction, brings the outputs 1 and 2 into a disabled (Hi-Z: high impedance) state to thereby make the state of power consumption equivalent to a power-off state. Therefore, through the execution of PWM drive, it is possible to turn off the drive current without using the power switches 804 and 805 in FIG. 9.

The above-described conventional shake correcting device based on the PWM drive control method using the H bridge circuit provides the advantageous effects of reduced power consumption and simplified construction as described above. However, it still suffers from the problem of impact noise generated by hitting of the shift lens 119 against the inner end of the lens barrel.

More specifically, when the PWM drive control method is employed, the controller is disposed in the microcomputer 120 as shown in FIG. 10, of such that the microcomputer 120 controls whether to enable the outputs from the H bridge driver 113. The power supply system is controlled such that power-system electric power (voltage of not lower than 5V) is supplied to the H bridge driver 113 alone, and control-system electric power (voltage e.g. of 3V) is supplied to the other component parts. When the shake correction is started immediately after the turning-on of the power of the image pickup apparatus or from a state e.g. in the reproduction mode, which does not need shake correction, the outputs from the H bridge driver 113 are switched from the disabled state to the enabled state, as described above, whereby the drive current is supplied to the drive coil 113*c*.

However, the outputs from the H bridge driver 113 are enabled when the shift lens 119 is in the vicinity of the inner end of the lens barrel, so that while the output from the position sensor 114 assumes a value corresponding to a point close to the inner end of the lens barrel, the target drive value corresponds to a point close to the center position of the shift lens 119. For this reason, the PWM output to be applied to the H bridge driver 113 as the correction amount, which corresponds to the difference between the two values is such as will cause a sudden motion of the shift lens 119. Consequently, when the outputs from the H bridge driver 113 are enabled, a large electric current suddenly flows through the drive coil 113*c* of the shift lens 119. As a result, the shift lens 119 is caused to hit against the inner end of the lens barrel, which generates large impact noise.

SUMMARY OF THE INVENTION

It is an object of the present invention to provide a shake correcting device and a shake correcting method which are capable of preventing a correcting optical device from hitting against a component part in the vicinity thereof to generate noise upon outputs from an H bridge driver for driving the correcting optical device being enabled, and a control program for implementing the method.

To attain the above object, in a first aspect of the present invention, there is provided a shake correcting device that corrects a shake of an object image picked up by an apparatus, comprising a shake detecting device that detects a shake of the apparatus, a correcting optical device that is movably disposed for optically correcting the shake of the apparatus, a position detecting device that detects a current position of the correcting optical device, a driving device that drives the correcting optical device according to a drive signal, an output control device that controls enabling and disabling of an output from the driving device, a target data-generating device that generates target correction data based on an output from the shake detecting device, and a drive signal-calculating device that calculates the drive signal based on the target correction data generated by the target data-generating device and output data from the position detecting device, wherein the target data-generating device sets the output data from the position detecting device to the target correction data for use in calculation of the drive signal by the drive signal-calculating device, while the output from the driving device is held in a disabled state by the output control device, and the target data-generating device sets the target correction data generated by the target data-generating device to the target correction data for use in calculation of the drive signal by the drive signal-calculating device, after the output from the driving device is enabled by the output control device.

With the arrangement of the first aspect of the present invention, it is possible to prevent the correcting optical device from largely moving to hit against a component part in the vicinity thereof to thereby generate impact noise upon the outputs from the drive device being enabled.

To attain the above object, in a second aspect of the present invention, there is provided a shake correcting device that corrects a shake of an object image picked up by an apparatus, comprising a shake detecting device that detects a shake of the apparatus, a correcting optical device that is movably disposed for optically correcting the shake of the apparatus, a position detecting device that detects a current position of the correcting optical device, a driving device that drives the correcting optical device according to a drive signal, an output control device that controls enabling and disabling of an output from the driving device, a target data-generating device that has a time constant, and generates target correction data based on an output from the shake detecting device, and a drive signal-calculating device that calculates the drive signal based on output data from the target data-generating device and output data from the position detecting device, wherein the target data-generating device includes a switching device that stops generation of the target correction data and sets the output data from the position detecting device as the output data from the target data-generating device, while the output from the driving device is held in a disabled state by the output control device, and resumes generation of the target correction data and switches the output data from the target data-generating device from the output data from the position detecting device to the target correction data generated by the target data-generating device according to the time constant, after the output from the driving device is switched from the disabled state to an enabled state.

To attain the above object, in a third aspect of the present invention, there is provided a shake correcting device that corrects a shake of an object image picked up by an apparatus, comprising a shake detecting device that detects a shake of the apparatus, a correcting optical device that is movably disposed for optically correcting the shake of the apparatus, a position detecting device that detects a current position of the correcting optical device, a driving device that drives the correcting optical device according to a PWM drive signal, an output control device that controls enabling and disabling of an output from the driving device, a target data-generating device that has a time constant, and generates target correction data based on an output from the shake detecting device, and a drive signal-calculating device that calculates the PWM drive signal based on output data from the target data-generating device and output data from the position detecting device, wherein the target data-generating device includes a storage device that stores data related to the output data from the target data-generating device, and a switching device that carries out a process for changing a content of the storage device to the output data from the position detecting device to thereby set the output data from the position detecting device to the output data from the target data-generating device, while the output from the driving device is held in a disabled state by the output control device, and stops the changing process and switches the output data from the target data-generating device from the output data from the position detecting device to the target correction data generated by the target data-generating device according to the time constant, after the output from the driving device is switched from the disabled state to an enabled state.

To attain the above object, in a fourth aspect of the present invention, there is provided a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a drive signal, and a position detecting device that detects a current position of the correcting optical device, comprising a target data-generating step of generating target correction data based on an output from the shake detecting device, a setting step of setting enabling and disabling of an output from the driving device, a selecting step of selecting output data from the position detecting device, while the output from the driving device is held in a disabled state, and selecting the target correction data generated in the target data-generating step after the output from the driving device is enabled, and a drive signal-calculating step of calculating the drive signal based on the data selected in the selecting step and the output data from the position detecting device, and outputting the calculated drive signal.

To attain the above object, in a fifth aspect of the present invention, there is provided a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a drive signal, and a position detecting device that detects a current position of the correcting optical device, comprising a target data-generating step of generating target correction data based on an output from the shake detecting device, a setting step of setting enabling and disabling of an output from the driving device, a switching step of stopping generation of the target correction data in the target data-generating step and sets output data from the position detecting device to output data generated in the target data-generating step, while the output from the driving device is held in a disabled state, and resuming the generation of the target correction data and switching the output data generated in the target data-generating step from the output data from the position detecting device to the target correction data generated in the target data-generating step according to a time constant, after the output from the driving device is switched from the disabled state to an enabled state, and a drive signal-calculating step of calculating the drive signal based on the output data generated in the target data-generating step and the output data from the position detecting device.

To attain the above object, in a sixth aspect of the present invention, there is provided a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a PWM drive signal, and a position detecting device that detects a current position of the correcting optical device, comprising a target data-generating step of generating target correction data based on an output from the shake detecting device, a setting step of setting enabling and disabling of an output from the driving device, a switching step of carrying out a process for changing a content of a storage device that stores data related to output data generated in the target data-generating step to output data from the position detecting device to thereby set the output data from the position detecting device to the output data generated in the target data-generating step, while the output from the driving device is held in a disabled state, and stopping the changing process and switching the output data generated in the target data-generating step from the output data from the position detecting device to the target correction data generated in the target data-generating step according to a time constant, after the output from the driving device is switched from the disabled state to an enabled state, and a drive signal-calculating step of calculating the PWM drive signal based on the output data generated in the target data-generating step and the output data from the position detecting device.

To attain the above object, in a seventh aspect of the present invention, there is provided a control program for executing a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a drive signal, and a position detecting device that detects a current position of the correcting optical device, comprising a target data-generating module for generating target correction data based on an output from the shake detecting device, a setting module for setting enabling and disabling of an output from the driving device, a selecting module for selecting output data from the position detecting device, while the output from the driving device is held in a disabled state, and selecting the target correction data generated by the target data-generating module, after the output from the driving device is enabled, and a drive signal-calculating module for calculating the drive signal based on the data selected by the selecting module and the output data from the position detecting device, and outputting the calculated drive signal.

To attain the above object, in an eight aspect of the present invention, there is provided a control program for executing a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a drive signal, and a position detecting device that detects a current position of the correcting optical device, comprising a target data-generating module for generating target correction data based on an output from the shake detecting device, a setting module for setting enabling and disabling of an output from the driving device, a switching module for stopping generation of the target correction data by the target data-generating module and sets output data from the position detecting device to output data generated by the target data-generating module, while the output from the driving device is held in a disabled state, and the generation of the target correction data and switching the output data generated by the target data-generating module from the output data from the position detecting device to the target correction data generated by the target data-generating module according to a time constant, after the output from the driving device is switched from the disabled state to an enabled state, and a drive signal-calculating module for calculating the drive signal based on the output data generated by the target data-generating module and the output data from the position detecting device.

To attain the above object, in a ninth aspect of the present invention, there is provided a control program for executing a shake correcting method for a shake correcting device including a shake detecting device that detects a shake of an apparatus that picks up an object image, a correcting optical device that is movably disposed for optically correcting the shake of the apparatus, a driving device that drives the correcting optical device according to a PWM drive signal, and a position detecting device that detects a current position of the correcting optical device, comprising a target data-generating module for generating target correction data based on an output from the shake detecting device, a storing module for storing data related to output data generated by the target data-generating module, a setting module for setting enabling and disabling of an output from the driving device, a switching module for carrying out a process for changing the data stored by the storing module to output data from the position detecting device to thereby set the output data from the position detecting device to the output data generated by the target data-generating module, while the output from the driving device is held in a disabled state, and stopping the changing process and switching the output data generated by the target data-generating module from the output data from the position detecting device to the target correction data generated by the target data-generating module according to the time constant, after the output from the driving device is switched from the disabled state to an enabled state, and a drive signal-calculating module for calculating the PWM drive signal based on the output data generated by the target data-generating module and the output data from the position detecting device.

The above and other objects, features, and advantages of the present invention will become more apparent from the following detailed description taken in conjunction with the accompanying drawings.

BRIEF DESCRIPTION OF THE DRAWINGS

FIGS. 2A and 2B are flowcharts showing an optical shake correction control process executed by a microcomputer appearing in FIG. 1, in which:
FIG. 2A shows a main process; and
FIG. 2B shows an interrupt process;

FIGS. 11A and 11B are diagrams useful in explaining an H bridge driver appearing in FIG. 10, in which:
FIG. 11A shows the arrangement of input and output terminals of the H bridge driver and elements associated therewith;
and
FIG. 11B shows the logical states of the input and output terminals and the outputs from the H bridge driver.

DETAILED DESCRIPTION OF THE PREFERRED EMBODIMENTS

The present invention will now be described in detail with reference to the drawings showing preferred embodiments thereof. Shake correcting devices according to the embodiments of the present invention described below are applied to a video camera.

Figure 1:
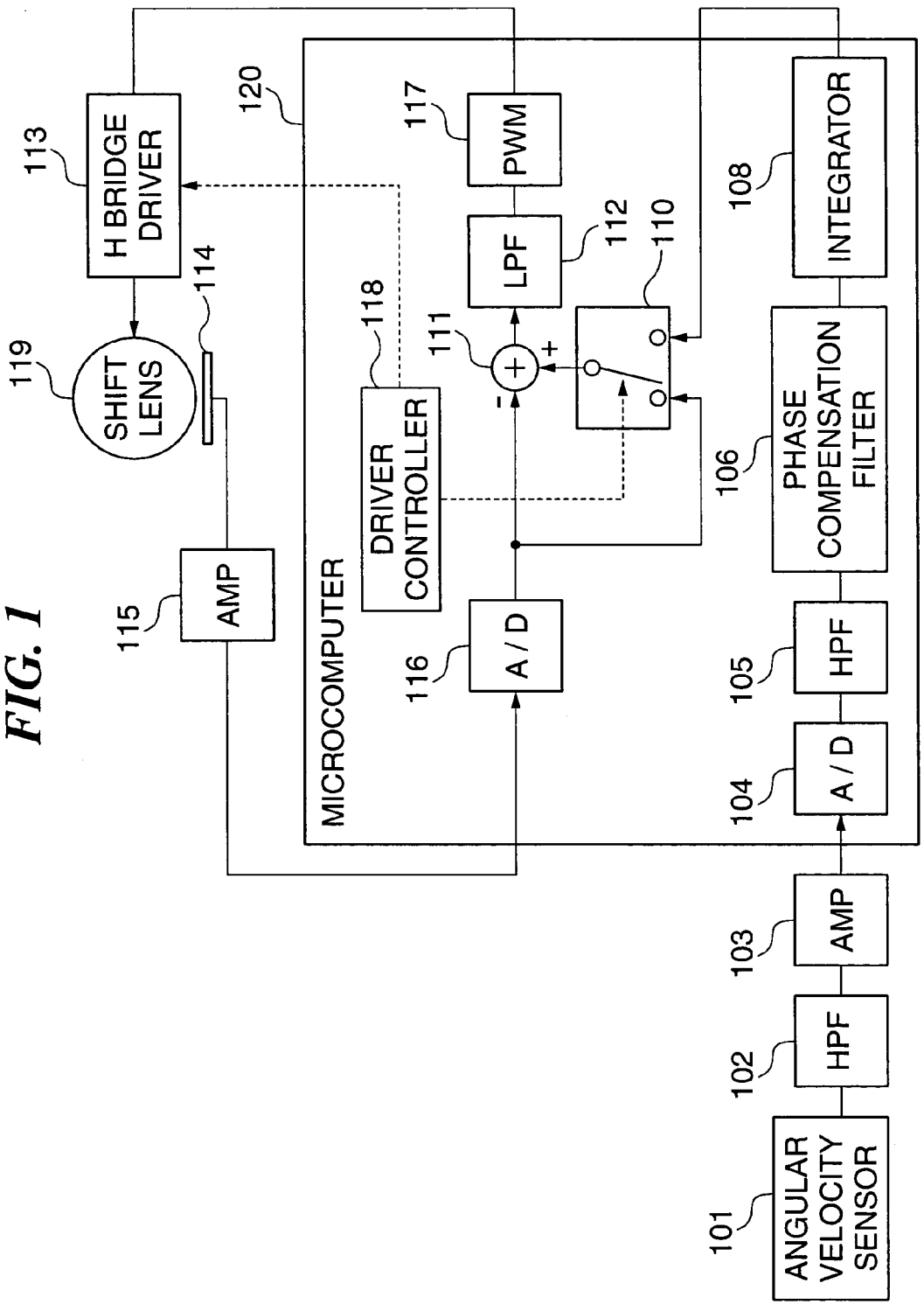
FIG. 1 is a block diagram schematically showing the arrangement of a shake correcting device according to a first embodiment of the present invention.
Figure 9:
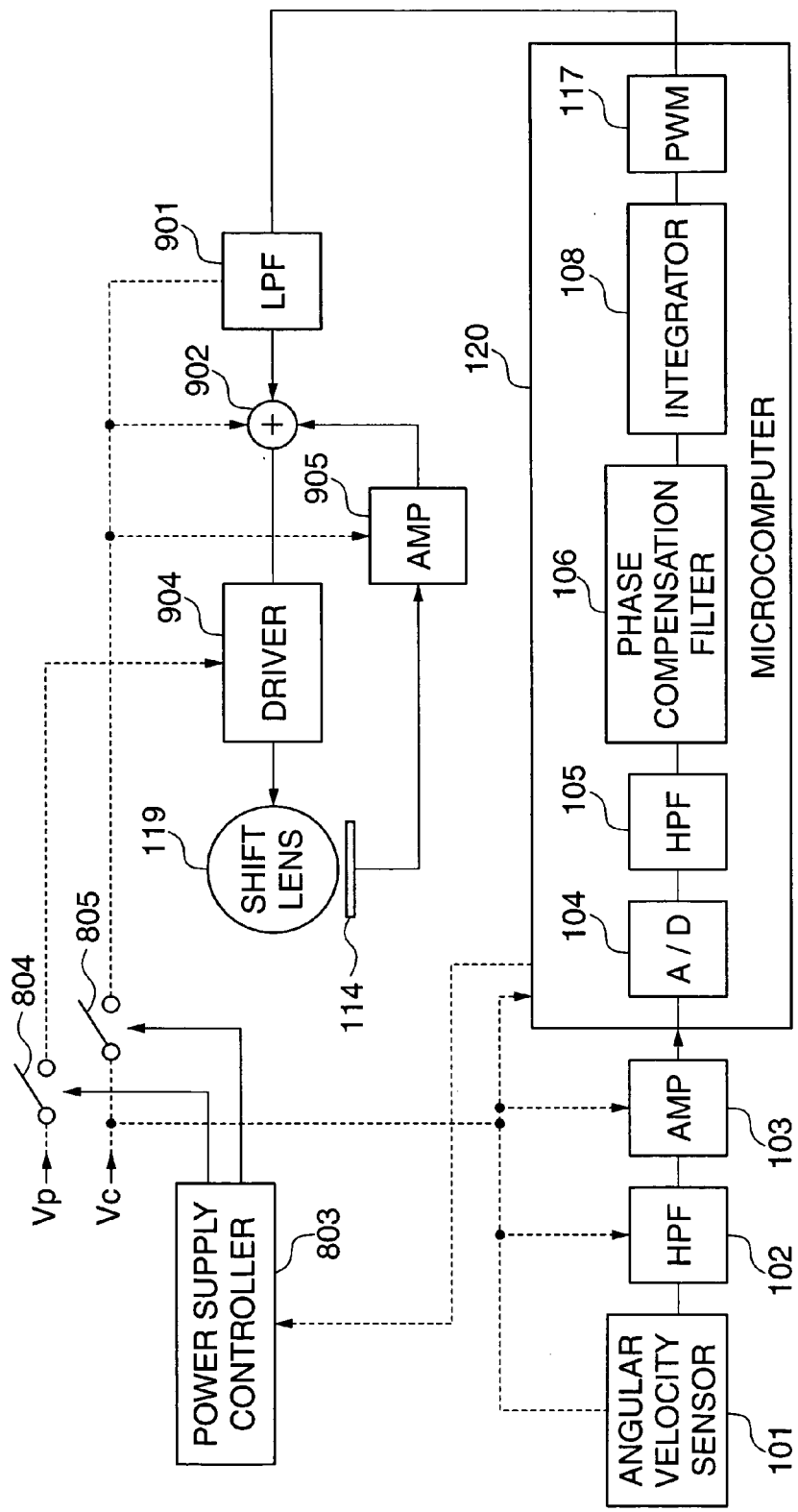
FIG. 9 is a block diagram showing the arrangement of a conventional optical shake correcting device.
Figure 10:
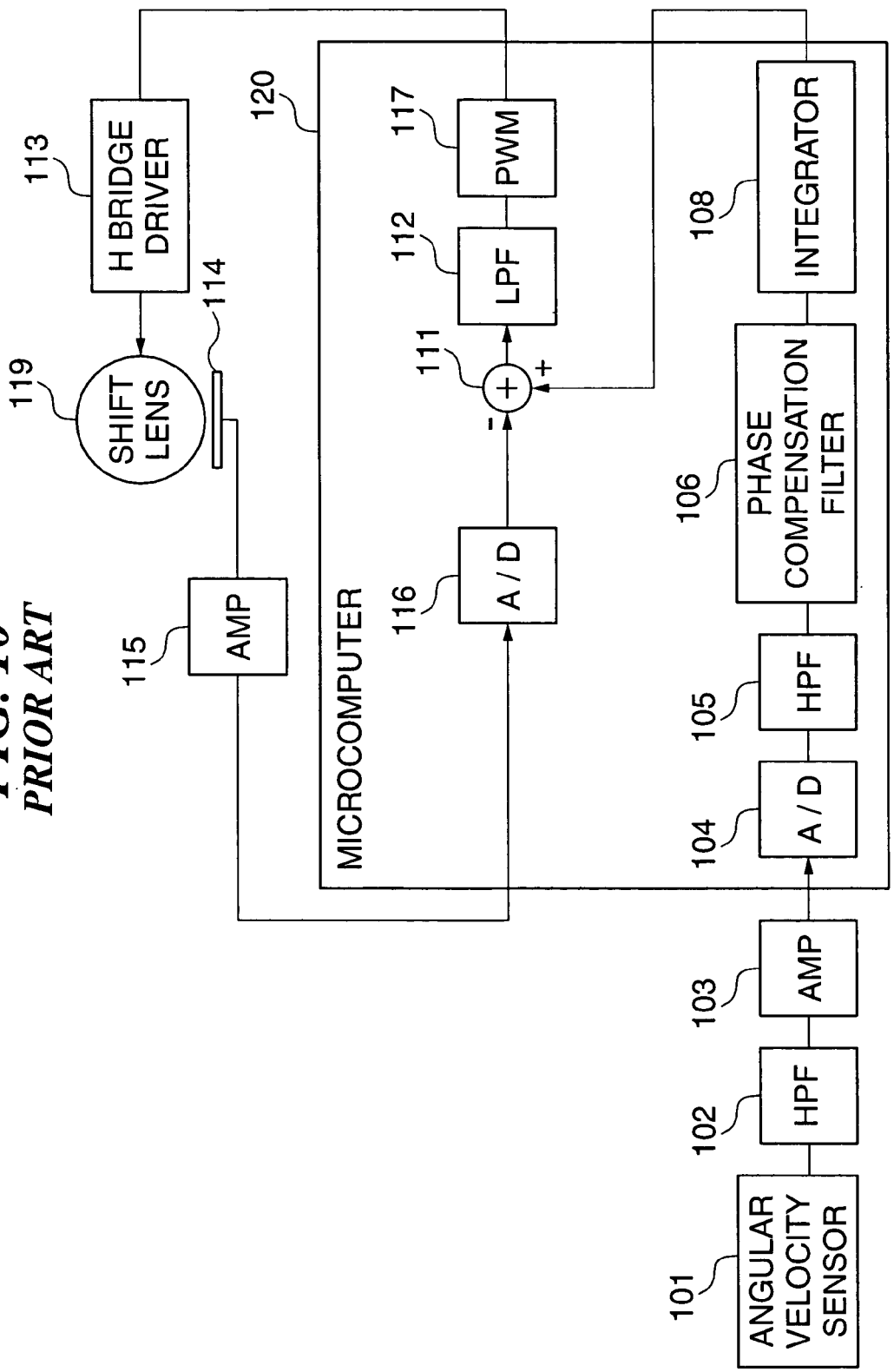
FIG. 10 is a block diagram showing the arrangement of a conventional optical shake correcting device based on a PWM drive control method using an H bridge circuit.
Figures 11A, 11B:
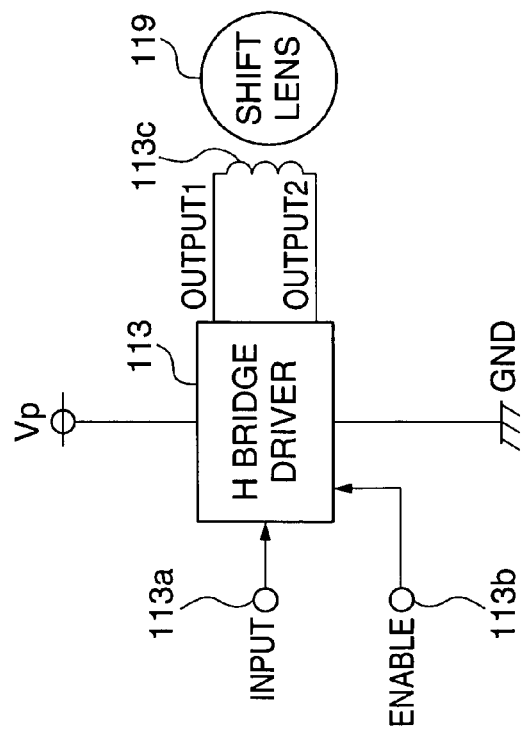

FIG. 1 is a block diagram schematically showing the arrangement of a shake correcting device according to a first embodiment of the present invention. The shake correcting device shown in FIG. 1 basically has the same arrangement as that of the shake correcting device shown in FIG. 9. Therefore, component parts and elements corresponding to those shown in FIG. 9 are designated by identical reference numerals, and detailed description thereof is omitted. Shake correction is typically carried out biaxially in lateral and longitudinal directions, but in the present embodiment, a description will be given of only shake correction carried out along a single axis, for simplicity. Further, in a microcomputer appearing in FIG. 1, there are illustrated only sections related to the control of shake correction.

The arrangement of the shake correcting device of the present embodiment is distinguished from the conventional shake correcting device shown in FIG. 9 in that the microcomputer 120 additionally includes an output selection switch 110 that switches between signals to be supplied to one of the input terminals of an adder 111, and a driver controller 118 that controls enabling and disabling of the outputs from an H bridge driver 113 and switches the output selection switch 110 in accordance with this control operation. More specifically, the output selection switch 110 determines, based on a control signal from the driver controller 118, whether to calculate the correction amount of a shift lens 119 using a target drive value as the output from an integrator 108 or using the output from a position sensor 114.

In the following, a detailed description will be given of a shake correction control process executed when the power of the video camera, for example, is turned on, with reference to flowcharts shown in FIGS. 2A, 2B, and 3.

FIGS. 2A and 2B are flowcharts showing the optical shake correction control process executed by the microcomputer 120. FIG. 2A shows a main process, while FIG. 2B shows an interrupt process. The main process in FIG. 2A only shows a part related to the present invention, which is executed once per vertical synchronization period of a television signal. FIG. 3 is a flowchart showing details of an initial operation process executed in a step S502 in FIG. 2A. The processes of FIGS. 2A, 2B, and 3 are executed in accordance with programs stored in a storage device, not shown, provided in the microcomputer 120.

Referring to FIG. 2A, first, when the power of the video camera is turned on, initialization is executed in a step S500. More specifically, initial values of registers and the like within the microcomputer 120, an interruption period, and so forth are set. In the next step S501, it is determined whether or not the count of an initial counter for determining timing of an initial operation of the shake correcting device has reached its maximum count. The initial counter is initialized to 0 in the step S500. If the count of the initial counter has not reached its maximum count in the step S501, the process proceeds to the step S502, wherein the initial operation process is executed according to the flowchart shown in FIG. 3.

Figure 3:
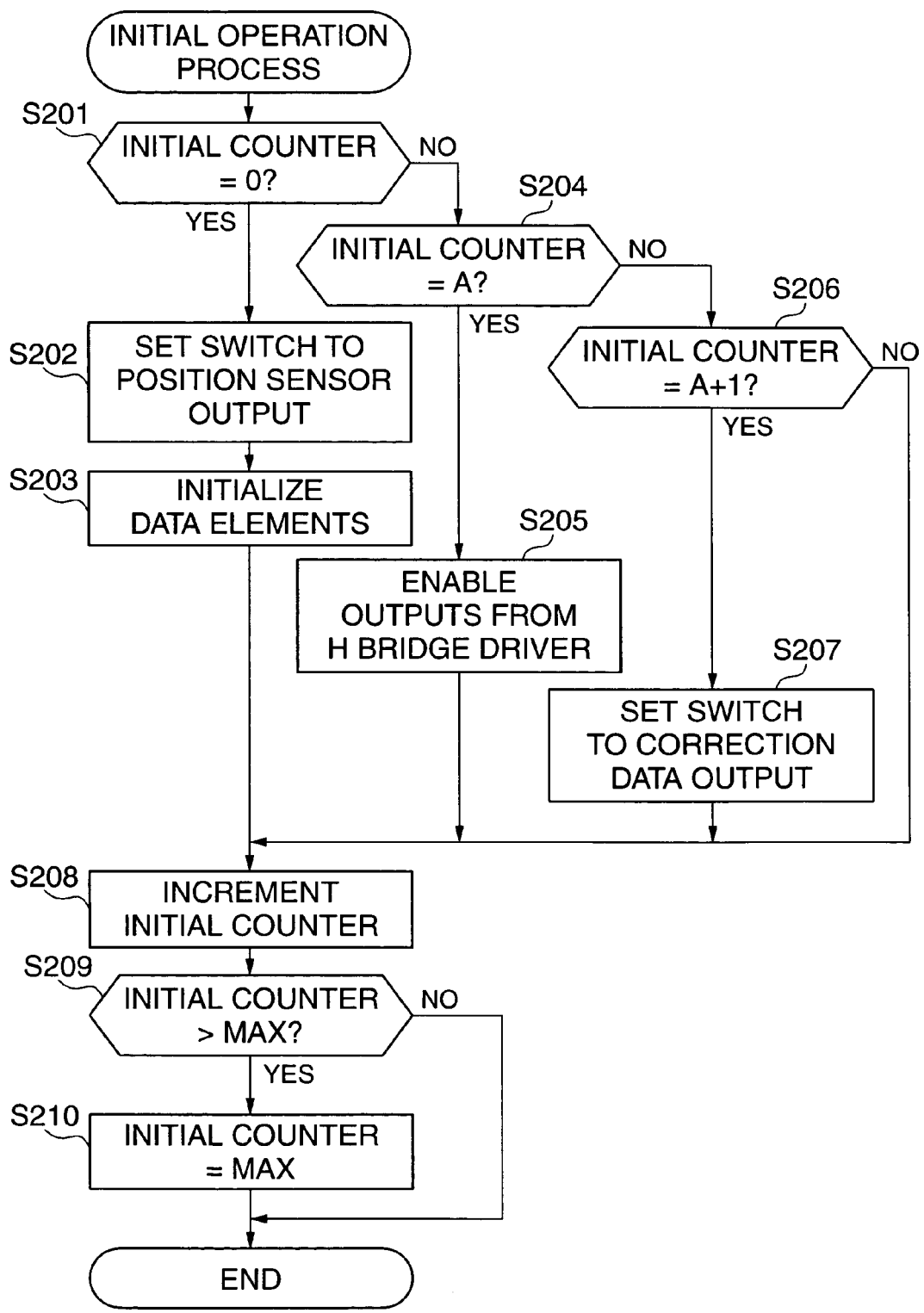
FIG. 3 is a flowchart showing details of an initial operation process executed in the main process in FIG. 2A.

In the initial operation process in FIG. 3, first, it is determined in a step S201 whether or not the count of the initial counter is equal to 0. Initially, the count of the initial counter is equal to 0, and therefore the process proceeds to a step S202, wherein the output selection switch 110 is switched to select the output from the position sensor 114, and in the next step S203, initialization of data is executed. In this step, a filter constant in the microcomputer 120 is set, and then the interrupt process shown in FIG. 2B is started.

In the next step S208, the count of the initial counter is incremented, and then steps S209 and S210 are executed to prevent the count of the initial counter from exceeding its maximum count.

Referring again to FIG. 2A, after completion of the initial operation process in the step S502, the process proceeds to a step S503, wherein it is determined whether or not the count of an interrupt counter has reached a preset count. In this step, the execution of the process is awaited until the interrupt process shown in FIG. 2B is executed a predetermined number of times. The interrupt process is carried out using a timer operating at a frequency of e.g. 1200 Hz or 900 Hz, depending on the capacity of the microcomputer 120. The frequency is set such that it is synchronized to the main process executed once per vertical synchronization period.

In a step S521 in FIG. 2B, an output signal from an angular velocity sensor 101 is received by an A/D converter 104, and then in a step S522, an HPF operation is carried out using an HPF 105. Further, in a step S522, a phase compensation operation is carried out by a phase compensation filter 106, and in a step S524, an integrating operation is carried out by an integrator 108.

In the next step S525, an output signal from the position sensor 114 is received by an A/D converter 116, and then in a step S526, one of the output (indicative of the current position of the shift lens 119) from the position sensor 114 and an output (indicative of a target correction value) from the integrator 108 is selected by the output selection switch 110. Thereafter, in a step S527, an adding operation is carried out by the adder 111, and then in a step S528, an LPF operation for reducing drive noise generated by the driver 113 is carried out using an LPF filter 112.

In the next step S529, a PWM output is delivered to the H bridge driver 113 by a PWM section 117. It is assumed here that in the step S202, the output selection switch 110 has selected the output from the position sensor 114, so that the output signal from the position sensor 114 is outputted as a target drive value from the adder 111. This causes the PWM output outputted from the microcomputer 120 as a result of the adding operation in the step S527 to serve to maintain the current position of the shift lens 119.

In the next step S530, the number of interrupts is counted, i.e. the count of the interrupt counter is incremented, followed by terminating the interrupt process. When the interrupt process is executed a predetermined number of times, it is judged in the step S503 that the count of the interrupt counter has reached the preset count, and the main process shown in FIG. 2A proceeds from the step S503 to a step S504.

In the step S504 in FIG. 2A, the count of the interrupt counter is cleared. Thereafter, the optical shake correction control process returns to the step S501, wherein the main process is started again.

This time, when the process proceeds to the initial operation process (step S502) shown in FIG. 3, it is determined in the step S201 that the count, of the initial counter is not equal to 0, and therefore the process proceeds to a step S204, wherein it is determined whether or not the count of the initial counter is equal to a predetermined count A. If the count of the initial counter is not equal to the predetermined count A, it is determined in a step S206 whether or not the count of the initial counter is equal to A+1. If the count of the initial counter is not equal to A+1, the count of the initial counter is incremented in a step S208, followed by the process proceeding to the step S503 in FIG. 2A. This sequential processing is repeatedly carried out until the count of the initial counter becomes equal to the predetermined count A. The predetermined count A is set to a value corresponding to a time period required for a filtered output obtained (through the steps S521 to S524) from the output (gyro signal) from the angular velocity sensor 101 to become stable.

When the count of the initial counter becomes equal to the predetermined count A, the outputs from the H bridge driver are enabled in a step S205. At this time, the target correction value (target drive value) for the shift lens 119 is set to a value corresponding to the current position, and therefore the shift lens 119 does not move. Then, during the next vertical synchronization period, the count of the initial counter becomes equal to A+1 (YES to step S206), so that the process proceeds from the step S206 to a step S207 in FIG. 3, wherein the output selection switch 110 is switched to select an actual target correction value as the output from the integrator 108. As a result, the target correction value is selected in the interrupt processing step S526 shown in FIG. 2B, and a shake correcting operation by the shift lens 119 is started.

When the target correction value is selected in the step S526, the PWM output in the step S529 should largely change, but the LPF operation as a countermeasure against noise generated by the H bridge driver 113 has been executed in the preceding step S528, so that a sharp change in the PWM output is suppressed.

As described above, according to the present embodiment, in the optical shake correcting device using an H bridge driver, the target correction value for the shift lens 119 is set to a value corresponding to the current position before the outputs from the H bridge driver 113 are enabled, so that at a time point the outputs from the H bridge driver 113 are enabled (i.e. when the driving of the shift lens 119 is started), the shift lens 119 can be held in the current position, and thereafter, when the drive signal is switched to the actual correction target signal, the action of the filter for eliminating high-frequency components of the signal suppresses a sharp change in the target value that otherwise occurs at the time of the signal switching. This makes it possible to prevent the shift lens 119 from largely moving and hitting against a inner end of the lens barrel to generate impact noise.

Figure 4:
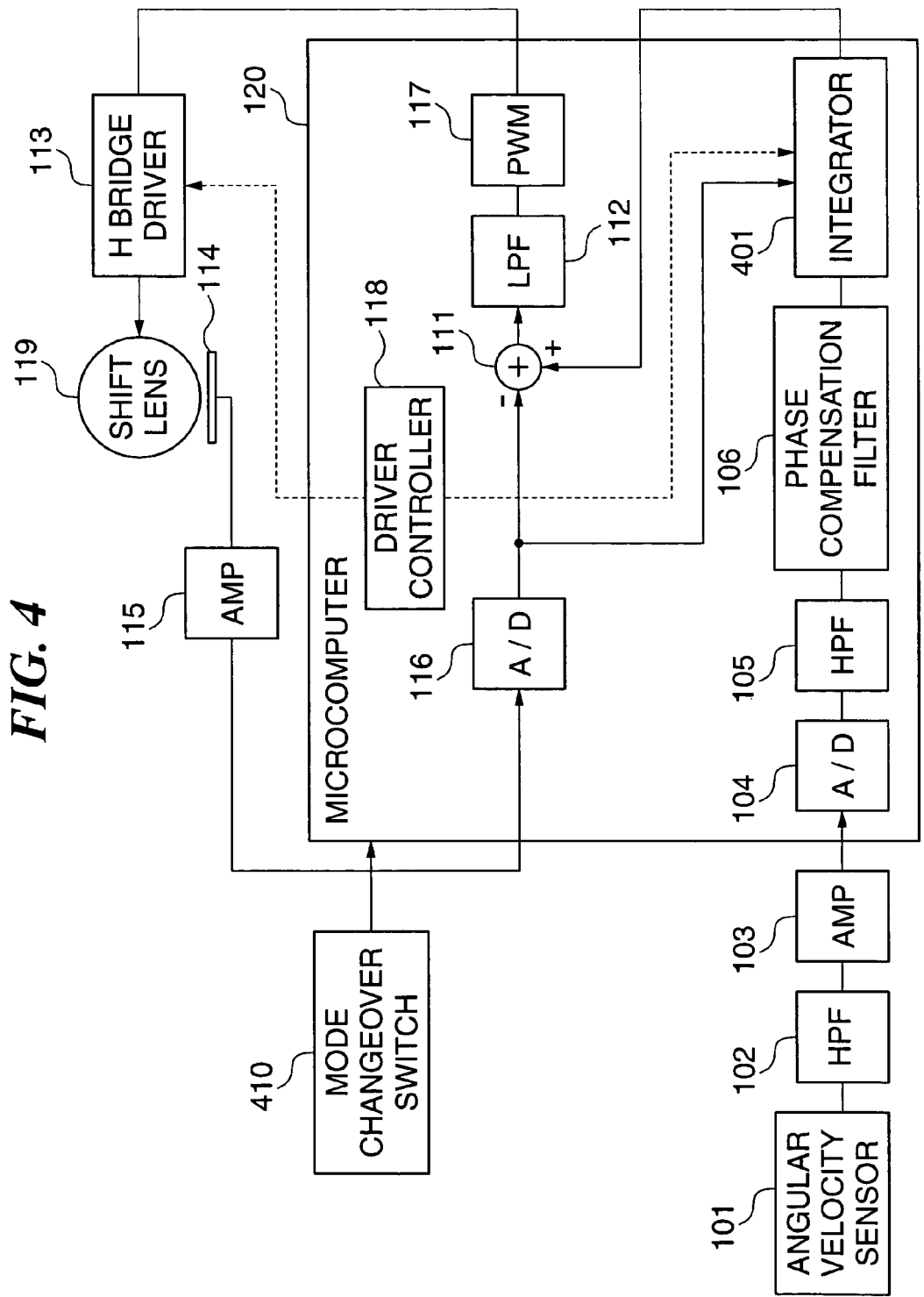
FIG. 4 is a block diagram schematically showing the arrangement of a shake correcting device according to a second embodiment of the present invention.

FIG. 4 is a block diagram schematically showing the arrangement of a shake correcting device according to a second embodiment of the present invention. The shake correcting device shown in FIG. 4 basically has the same arrangement as that of the shake correcting device shown in FIG. 1. Therefore, component parts and elements corresponding to those shown in FIG. 1 are designated by identical reference numerals, and detailed description thereof is omitted.

The arrangement of the shake correcting device according to the present embodiment is distinguished from that of the shake correcting device shown in FIG. 1 in that in the microcomputer 120, the integrator 108 is replaced by an integrator 401 as a characterizing feature of the present embodiment; the output selection switch 110 is omitted; and a switching signal from the driver controller 118 and an output signal from the A/D converter 116 as data indicative of the output from the position sensor 114, are additionally supplied to the integrator 401. Reference numeral 410 in FIG. 4 designates a switch that switches the video camera between a recording mode and a reproduction mode.

Figure 5:
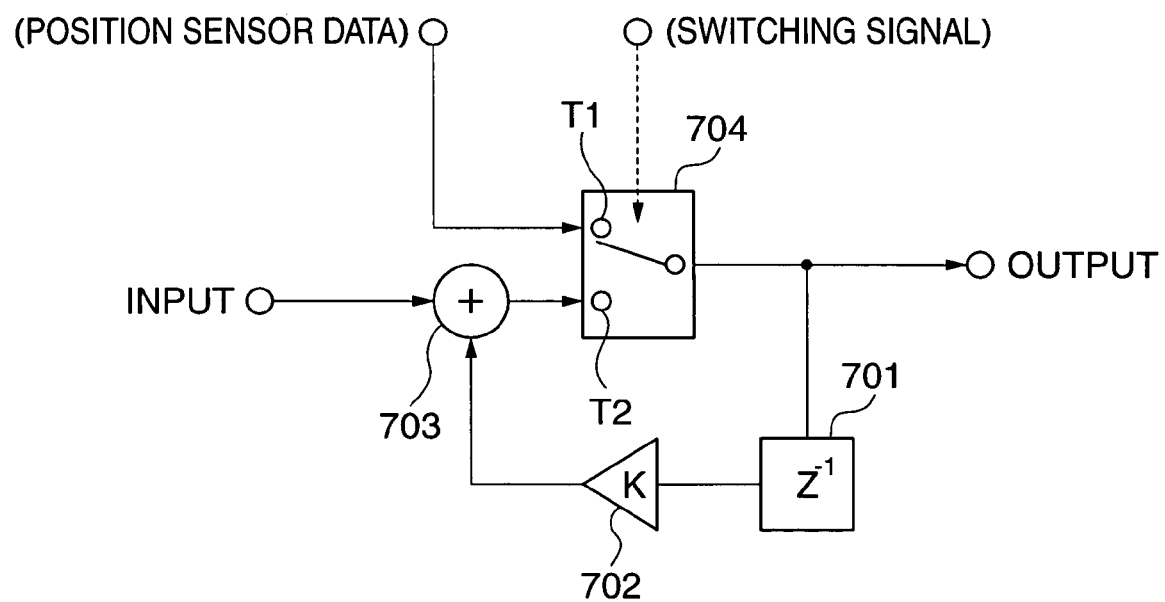
FIG. 5 is a block diagram showing the arrangement of an integrator appearing in FIG. 4.

FIG. 5 is a block diagram showing the construction of the integrator 401 appearing in FIG. 4.

As shown in FIG. 5, the integrator 401 is comprised of an intermediate variable (Z-1) 701, an integral constant (K) 702, an adder 703, and a changeover switch 704. Further, although not shown, there are provided a RAM for storing the intermediate variable (Z-1) 701, and a RAM for storing output data from the integrator 401.

When a common terminal of the changeover switch 704 is connected to a switching terminal T2, the integrator in its entirety serves as an integrator, whereas when the common terminal is connected to a switching terminal T1, data indicative of the output from the position sensor 114 is set to the intermediate variable (Z-1) 701, and at the same time delivered as the output from the integrator 401. In other words, when the common terminal is connected to the switching terminal T1, the data acquired from the position sensor is written into both the RAM for storing the intermediate variable (Z-1) 701 and the RAM for storing output data from the integrator 401.

With this construction, when the common terminal of the changeover switch 704 is switched from the switching terminal T1 to the switching terminal T2, the output from the integrator 401 is switched from the data from the position sensor 114 to normal target correction value data from the angular velocity sensor, according to the time constant of the integrator 401.

Figure 6:
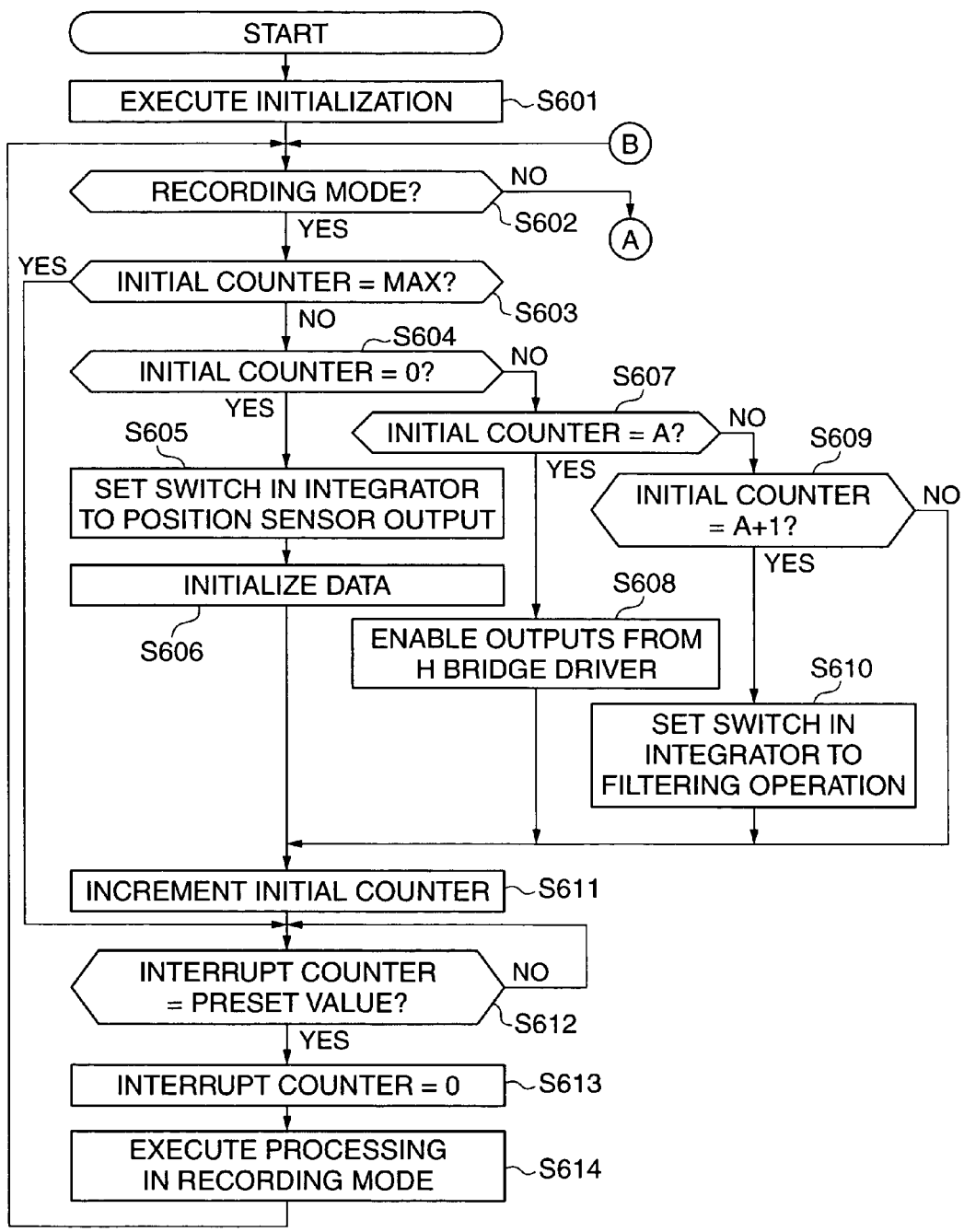
FIG. 6 is a flowchart showing a main process of an optical shake correction control process executed by a microcomputer appearing in FIG. 4.
Figure 7:
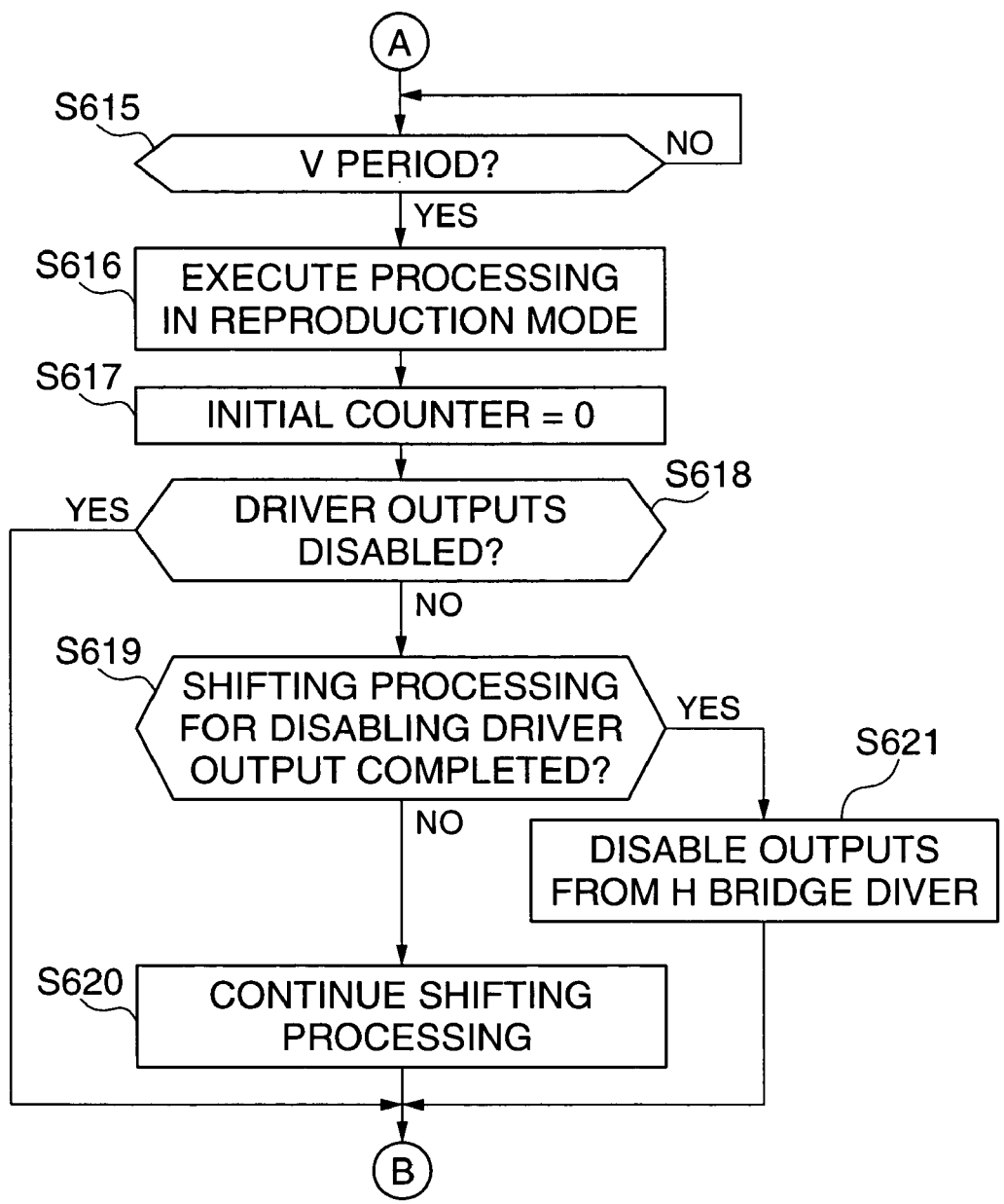
FIG. 7 is a continued part of the flowchart in FIG. 6.
Figure 8:
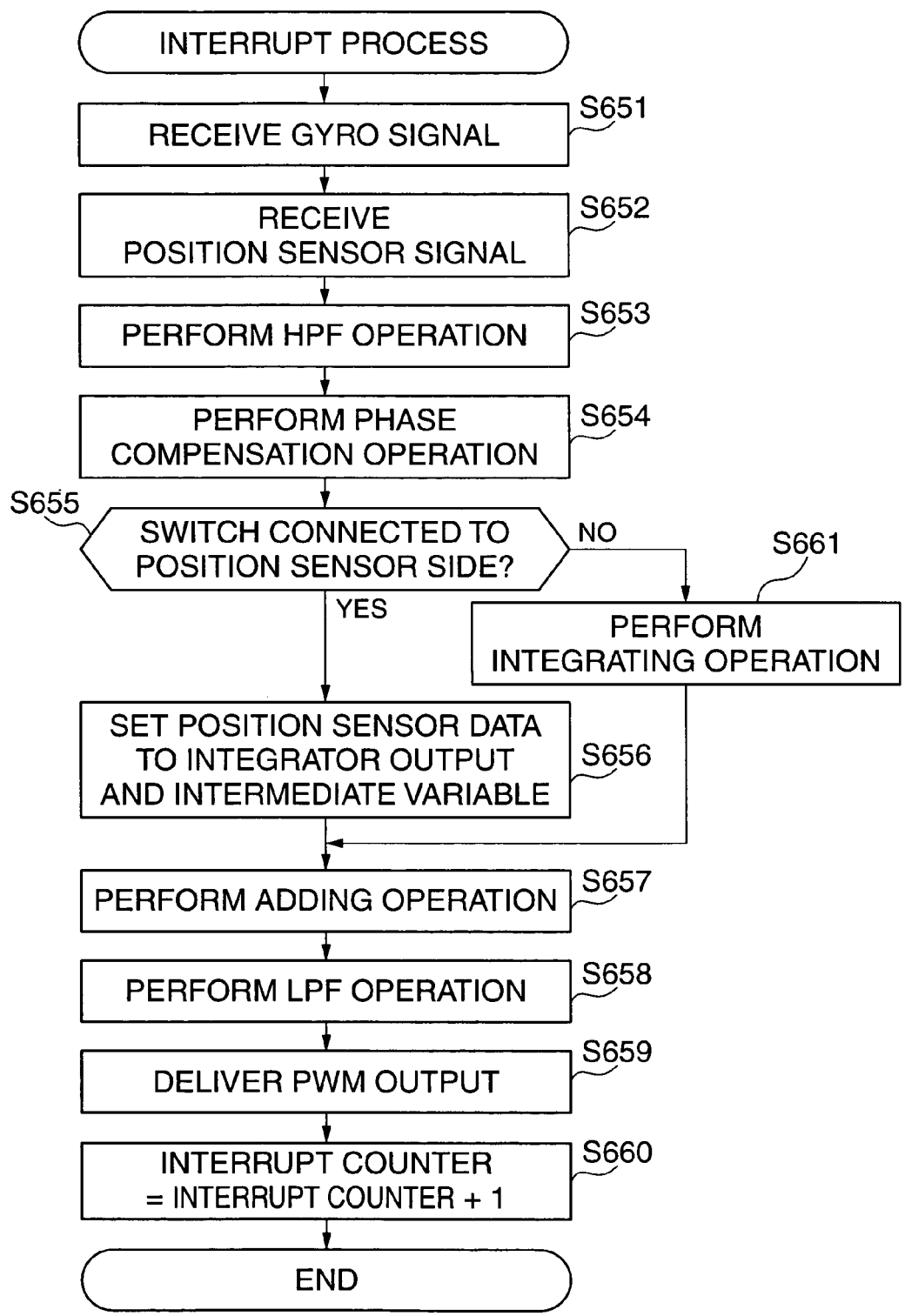
FIG. 8 is a flowchart showing an interrupt process of the optical shake correction control process executed by the microcomputer.

FIGS. 6, 7, and 8 are flowcharts showing an optical shake correction control process executed by the microcomputer 120 in FIG. 4. FIGS. 6 and 7 are a flowchart showing a main process, while FIG. 8 is a flowchart showing an interrupt process. In the present embodiment, a description will be given of the case where the outputs from an H bridge driver 113 are enabled when the video camera is switched from the reproduction mode which does not need shake correcting operation, to the recording mode which needs shake correcting operation. The processes of FIGS. 6, 7, and 8 are executed in accordance with programs stored in a storage device, not shown, provided in the microcomputer 120.

When the power is turned on in the reproduction mode, first in a step S601 in FIG. 6, the microcomputer 120 is initialized. Then, in a step S602, it is determined, based on the setting state of the mode changeover switch 410, whether the video camera is in the recording mode or in the reproduction mode. Since the video camera is now in the reproduction mode as described above, the process proceeds to a step S615, wherein a vertical synchronizing signal is awaited. This is because the video camera is controlled in synchronism with the vertical synchronizing signal. When the vertical synchronizing signal is received, the process proceeds to a step S616, wherein processing in the reproduction mode is executed. Then, in a step S617, the count of an initial counter is cleared.

The next steps S618 to S621 are executed to disable the outputs from the H bridge driver 113 when the video camera is switched from the recording mode to the reproduction mode. First, it is determined in the step S618 whether or not the outputs from the H bridge driver 113 are in a disabled state. If the outputs from the H bridge driver 113 are in an enabled state, the process proceeds to a step S619, wherein it is determined whether or not processing for disabling the outputs from the H bridge driver 113, i.e. the processing for shifting the shift lens 119 to a point close to the inner end of the lens barrel, as described before with reference to FIG. 9, is completed. If the processing for shifting the shift lens 119 to the point close to the inner end of the lens barrel is not completed, the shifting processing is continued in a step S620, whereas if the shifting processing is completed, the outputs from the H bridge driver 113 are disabled in the step S621.

As described above, when the power is turned on in the reproduction mode, the outputs from the H bridge driver 113 are in the disabled state, and when the video camera is switched from the recording mode to the reproduction mode, the outputs from the H bridge driver 113 are also disabled by execution of the steps S618 to S621, so that energy can be saved.

On the other hand, when the video camera is switched from the reproduction mode to the recording mode, the process proceeds from the step S602 to a step S603. Processing from the step S603 to a step S613 is substantially identical to the initial operation process described above with respect to the first embodiment with reference to FIG. 3.

More specifically, it is determined in the step S603 whether or not the count of the initial counter has reached its maximum count. If the count of the initial counter has not reached its maximum count, it is determined in the step S604 whether or not the count of the initial counter is equal to 0. The count of the initial counter is equal to 0 immediately after the video camera is switched to the recording mode, and therefore the changeover switch 704 of the integrator 401 is set to select the output (switching terminal T1) from the position sensor in the step S605. Then, in the step S606, initialization related to shake correction is carried out and the interrupt process in FIG. 8 are started.

In the next step S611, the count of the initial counter is incremented, and the process proceeds to a step S612, wherein the execution of the process is awaited until the interrupt process shown in FIG. 8 is executed a predetermined number of times. In short, it is determined whether or not the count of an interrupt counter has reached a preset count. Similarly to the first embodiment, the interrupt process is carried out using a timer operating at a frequency of e.g. 1200 Hz or 900 Hz, such that it is synchronized with the vertical synchronizing signal. The preset count in the step S612 is set to 20 when the interrupt frequency is 1200 Hz, and to 15 when the interrupt frequency is 900 Hz, so as to match with the vertical synchronizing signal of 60 Hz.

As shown in FIG. 8, in this interrupt process, first in a step S651, an output signal from the angular velocity sensor 101 is received by the A/D converter 104, and in a step S652, an output signal from the position sensor 114 is received by the A/D converter 116. Thereafter, in a step S653, an HPF operation is carried out by an HPF 105, and in a step S654, a phase compensation operation is carried out by a phase compensation filter 106.

In the next step S655, it is determined whether or not the changeover switch 704 of the integrator 401 is connected to the position sensor side (switching terminal T1). If the changeover switch 704 is connected to the position sensor side, the process proceeds to a step S656.

In the step S656, the data from the position sensor 114 is delivered as the output from the integrator 401 and set to the intermediate variable (Z-1), whereby the target correction value is set to a value corresponding to the current position of the shift lens 119. In the actual program, data indicative of the output from the position sensor 114 and received in the step S652 is written into both the RAM for storing the intermediate variable (Z-1) 701 and the RAM for storing the output data of the integrator 401. Then, in a step S657, an adding operation is carried out by an adder 111 whereby a correction amount is calculated.

Further, in a step S658, an LPF 112 having received the calculated correction amount carries out an LPF operation for reducing drive noise generated by the driver 113, and in the next step S660, a PWM output is delivered to the H bridge driver 113 by a PWM section 117. Then, in a step S660, the count of the interrupt counter is incremented, followed by terminating the interrupt process.

When the above-described interrupt process is executed the predetermined number of times, it is judged in the step S612 that the count of the interrupt counter has reached the preset count, and the main process in FIG. 6 proceeds to a step S613, wherein the count of the interrupt counter is cleared. Thereafter, in a step S614, actual operations in the recording mode are carried out, followed by the program returning to the step S602.

On the other hand, if the count of the initial counter is equal to a value other than 0 in the step S604, the process proceeds to a step S607, wherein it is determined whether or not the count of the initial counter is equal to a predetermined count A. The predetermined count A used here is set to a count value corresponding to a time period required for the result of the phase compensation operation (step S654) carried out in the interrupt process to become stable.

If the count of the initial counter is equal to the predetermined count A, the process proceeds to a step S608, wherein the outputs from the H bridge driver are enabled. At this time, the target drive value for the shift lens 119 has been set to the value corresponding to the current position of the shift lens 119, so that the shift lens 119 is held in the current position. Then, during the next vertical synchronization period, the count of the initial counter becomes equal to A+1, and therefore the process proceeds from a step S609 to a step S610, wherein the switch 704 in the integrator 401 is switched to the switching terminal T2.

When the interrupt process is carried out after execution of the step S610, the process proceeds from the step S655 to a step S661 in the interrupt process, whereby the normal filtering operation of the output signal from the angular velocity sensor 101 starts to be carried out. This operation shifts the target drive value (the output from the integrator 401) from the value corresponding to the current position of the shift lens 119 to an actual target correction value, according to the time constant of the integrator 401. Thus, hitting of the shift lens 119 against the inner end of the lens barrel and resulting generation of impact noise can be prevented.

In the main process, the count of the initial counter is continually incremented from then on, and it is determined in the step S603 whether or not the count of the initial counter has reached its maximum value. When the maximum value is reached, the process proceeds from the step S603 to the step S612. Thus, the initial operation process at the time of switching the mode switching is completed.

As described above, in the present embodiment, at a time point the outputs from the H bridge driver 113 are enabled, data indicative of the output from the position sensor 114 is outputted from the integrator 401, whereas immediately after the enabling of the outputs, the output from the integrator 401 is switched to data of the target correction value based on the output from the angular velocity sensor 101, according to the time constant of the integrator 401. This makes it possible to prevent the shift lens 119 from hitting against the inner end of the lens barrel to generate impact noise at the time point the outputs from the H bridge driver 113, are enabled to carry out a shake correcting operation by the PWM drive.

Although in the present embodiment, the time constant set for normal operation of the integrator 401 is fixed, it may be made variable. For example, when the common terminal of the changeover switch 704 in FIG. 5 is connected to the switching terminal T1, the time constant may be set short by changing the integral constant (K), so as to shorten the time period required for the output from the integrator 401 to become stable after switching of the changeover switch 704 from the switching terminal T1 to the switching terminal T2. In this case, the integral constant (K) is returned to its normal value after the output from the integrator 401 has been stabilized.

Further, although the first and second embodiments relate to optical shake correction using the shift lens 119 of the video camera, the present invention can be applied to optical shake correction using a mechanism, such as a VAP (Vari-Angle Prism), and further, the present invention can be applied to optical apparatuses, such as cameras or digital cameras incorporating an optical shake correcting device based on the PWM drive method using an H bridge driver.

The present invention may either be applied to a system composed of a plurality of apparatuses or to a single apparatus.

It is to be understood that the object of the present invention may also be accomplished by supplying a system or an apparatus (e.g., a personal computer) with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network from another computer, a database or the like, not shown, connected to the Internet, a commercial network, a local area network, or the like.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A shake correcting device that corrects shaking of an object image picked up by an apparatus, comprising:
    a correcting optical device that is movably disposed for optically correcting the shaking of the apparatus, to which said shake correcting device is attached;
    a position detecting device that detects and outputs a current position of said correcting optical device;
    a shake detecting device that detects shaking of the apparatus and outputs a signal representing the detected shaking of the apparatus, wherein said shake detecting device comprises an angular velocity sensor that outputs the signal representing the detected shaking of the apparatus;
    a target data-generating device that generates target correction data based on an output from said shake detecting device;
    a drive signal-calculating device that calculates a drive signal based on the target correction data and output data from said position detecting device;
    a driving device that drives said correcting optical device according to the drive signal; and
    an output control device that controls enabling and disabling of an output from said driving device,
    wherein said output control device includes a switching device that sets the output data from said position detecting device to the target correction data, for a time period after said output control device has enabled the output from said driving device before the output of said shake detecting device becomes stable, and sets the target correction data based on the output from said shake detecting device and a predetermined time constraint, after the output of said shake detecting device has become stable.

2. A shake correcting device that corrects shaking of an object image picked up by an apparatus, comprising:
    a correcting optical device that is disposed movably in a direction perpendicular to an optical axis of the apparatus, for optically correcting the shaking of the apparatus, to which said shake correcting device is attached;
    a position detecting device that detects and outputs a current position of said correcting optical device;
    a shake detecting device that detects shaking of the apparatus and outputs a signal representing the detected shaking of the apparatus, wherein said shake detecting device comprises an angular velocity sensor that outputs the signal representing the detected shaking of the apparatus;
    a target data-generating device that generates target correction data based on an output from said shake detecting device;
    a drive signal-calculating device that has a filter for eliminating high-frequency components of the shaking, and calculates a PWM drive signal based on the target correction data and output data from said position detecting device and outputs the PWM drive signal through the filter;
    a driving device that drives said correcting optical device according to the PWM drive signal;
    an output control device that controls enabling and disabling of an output of said driving device; and
    an output signal-selecting device that selects any one of an output from said target data-generating device and an output from said position detecting device, and sets the selected output to the target correction data for use in calculation of the PWM drive signal by said drive signal-calculating device,
    wherein said output signal-selecting device includes a switching device that sets the output from said position detecting device, for a time period after the output control device has enabled the output from said driving device before the output of said shake detecting device becomes stable, and sets the output from said target correction data based on the output from said shake detecting device and a predetermined time constant, after the output from said shake detecting device has become stable.

3. A shake correcting device that corrects shaking of an object image picked up by an apparatus, comprising:
    a correcting optical device that is movably disposed for optically correcting the shaking of the apparatus, to which said shake correcting device is attached;
    a position detecting device that detects and outputs a current position of said correcting optical device;
    a shake detecting device that detects shaking of the apparatus and outputs a signal representing the detected shaking of the apparatus, wherein said shake detecting device comprises an angular velocity sensor that outputs the signal representing the detected shaking of the apparatus;
    a target data-generating device that generates target correction data based on an output from said shake detecting device;
    a phase compensation detecting device that subjects said shake detecting device to a phase compensation operation in the generation of the target correction data;
    a drive signal-calculating device that calculates a drive signal based the target correction data and output data from said position detecting device;
    a driving device that drives said correcting optical device according to the drive signal; and
    an output control device that controls enabling and disabling of an output from said driving device,
    wherein said output control device includes a switching device that sets the output data from said position detecting device to the target correction data, for a time period after the output control device has enabled the output from said driving device before the output of the phase compensation operation becomes stable, and sets the target correction data based on the output from said shake detecting device and a predetermined time constraint, after the output of the shake detecting device has become stable.

4. A shake correcting device that corrects shaking of an object image picked up by an apparatus, comprising:

a correcting optical device that is disposed movably in a direction perpendicular to an optical axis of the apparatus, for optically correcting the shaking of the apparatus, to which said shake correcting device is attached;

a position detecting device that detects and outputs a current position of said correcting optical device;

a shake detecting device that detects shaking of the apparatus and outputs a signal representing the detected shaking of the apparatus, wherein said shake detecting device comprises an angular velocity sensor that outputs the signal representing the detected shaking of the apparatus;

a target data-generating device that generates target correction data based on an output from said shake detecting device;

a phase compensation detecting device that subjects said shake detecting device to a phase compensation operation in the generation of the target correction data;

a drive signal-calculating device that has a filter for eliminating high-frequency components of the shaking, and calculates a PWM drive signal based on the target correction data and output data from said position detecting device and outputs the PWM drive signal through the filter;

a driving device that drives said correcting optical device according to the PWM drive signal;

an output control device that controls enabling and disabling of an output of said driving device; and an output signal-selecting device that selects any one of an output from said target data-generating device and an output from said position detecting device, and sets the selected output to the target correction data for use in calculation of the PWM drive signal by said drive signal-calculating device, wherein said output signal-selecting device includes a switching device that sets the output from said position detecting device, for a time period after the output control device has enabled the output from said driving device before the phase compensation operation becomes stable, and sets the output from said target correction data based on the output from said shake detecting device and a predetermined time constant, after the output of the shake detecting device has become stable.

5. An image pickup apparatus having a shake correcting device as claimed in claim 1.

6. An image pickup apparatus having a shake correcting device as claimed in claim 2.

7. An image pickup apparatus having a shake correcting device as claimed in claim 3.

8. An image pickup apparatus having a shake correcting device as claimed in claim 4.

* * * * *